US008934230B2

(12) United States Patent
Hsiung et al.

(10) Patent No.: US 8,934,230 B2
(45) Date of Patent: Jan. 13, 2015

(54) PORTABLE COMPUTER WITH EASY ASSEMBLY

(75) Inventors: Ta-Chun Hsiung, Taipei Hsien (TW);
Chi-Ting Lin, Taipei Hsien (TW);
Chun-Yu Lin, Taipei Hsien (TW);
Chu-Cheng Yang, Taipei Hsien (TW);
Jyun-Shuo Liang, Taipei Hsien (TW)

(73) Assignee: Wistron Corporation, Hsinchih, New Taipei (TW)

( * ) Notice: Subject to any disclaimer, the term of this patent is extended or adjusted under 35 U.S.C. 154(b) by 188 days.

(21) Appl. No.: 12/826,686

(22) Filed: Jun. 30, 2010

(65) Prior Publication Data

US 2011/0096488 A1 Apr. 28, 2011

(30) Foreign Application Priority Data

Oct. 23, 2009 (TW) .............................. 98135894 A

(51) Int. Cl.
*H05K 5/00* (2006.01)
*H05K 7/00* (2006.01)
*G11B 33/02* (2006.01)
*A47G 1/10* (2006.01)
*E04G 3/00* (2006.01)
*E05C 5/02* (2006.01)
*G06F 1/16* (2006.01)

(52) U.S. Cl.
CPC ............ *G06F 1/1681* (2013.01); *G06F 1/1658* (2013.01); *G06F 1/1616* (2013.01)
USPC ............ 361/679.27; 361/679.32; 361/679.33; 361/679.34; 361/679.36; 361/679.37; 361/679.58; 369/75.21; 248/316.5; 248/292.14; 292/8; 292/4; 74/142

(58) Field of Classification Search
USPC ........................... 361/679.02, 679.55–679.59, 361/679.26–679.29, 679.01–679.09, 361/679.1–679.19, 679.31–679.45, 361/679.55–679.6, 724–747; 345/156, 157, 345/168, 169, 184; 455/325, 556.1, 550.1, 455/90.1, 575.1; 248/80–88, 155.1–155.5, 248/166–173, 180.1–186.2, 229.1–231.51, 248/271.4; 439/60, 151–160, 327, 328, 439/331, 638; 292/1–62, 113, 292/169.11–169.23, 341.11–341.19; 74/141–169, 380–387
See application file for complete search history.

(56) References Cited

U.S. PATENT DOCUMENTS

| | | | | |
|---|---|---|---|---|
| 6,002,583 | A | * | 12/1999 | Shoji et al. ............... 361/679.55 |
| 6,385,468 | B2 | * | 5/2002 | Arnold .......................... 455/572 |
| 2008/0192426 | A1 | * | 8/2008 | Minaguchi et al. ........... 361/686 |
| 2009/0053590 | A1 | * | 2/2009 | Yamaguchi ................... 429/149 |
| 2009/0059488 | A1 | * | 3/2009 | Minaguchi et al. ...... 361/679.09 |

FOREIGN PATENT DOCUMENTS

CN 2874589 Y 2/2007
TW 200846878 12/2008

OTHER PUBLICATIONS

Office action mailed on May 2, 2012 for the China application No. 200910210070.9, p. 3 line 2-31, p. 4 and p. 5 line 1-20.

* cited by examiner

*Primary Examiner* — Jerry Wu

(74) *Attorney, Agent, or Firm* — Winston Hsu; Scott Margo

(57) ABSTRACT

A portable computer includes a display module, and a hinge module. One end of the hinge module is connected to the display module. The portable computer further includes a host module. The host module includes a housing whereon an accommodating space is formed. The other end of the hinge module is fixed inside the accommodating space. The portable computer further includes a battery component installed on the housing for covering the accommodating space so as to cover the hinge module.

9 Claims, 6 Drawing Sheets

PORTABLE COMPUTER WITH EASY ASSEMBLY

BACKGROUND OF THE INVENTION

1. Field of the Invention

The present invention relates to a portable computer with easy assembly, and more particularly, to a portable computer with modular assembly of a display module and a host module.

2. Description of the Prior Art

With the advanced information technology, knowledge can be exchanged, collected, and stored via digital data form. A computer for reading and writing the digital data is an important tool in the modern society, for example, a notebook computer is a kind of a popular portable computer. Generally, assembling a hinge structure between a liquid crystal display and a host spends labor hours in assembly of the notebook computer. For example, a conventional method of assembling the liquid crystal display and the host is combining the hinge structure connected to the liquid crystal display with an upper cover or a lower cover of the host before assembling the upper cover and the lower cover, and assembling the remaining cover with the other side of the hinge structure so as to dispose the hinge structure between the upper cover and the lower cover of the host.

However, the liquid crystal display is an independent object of the conventional assembly, and the combination of the liquid crystal display and the host becomes another independent object additionally. The host is a semi-finished product before assembling with the liquid crystal display, which means the liquid crystal display must combine with the host before assembling the upper cover and the lower cover, and the liquid crystal display and the host including the upper cover and the lower cover are not two independent modules. That is to say, a user can not purchase the liquid crystal display and the host including the upper cover and the lower cover respectively for fabricating the notebook computer. The user must purchase the liquid crystal display and the semi-finished host for fabricating the notebook computer. Thus, inconvenient assembly of the notebook computer decreases flexibility of mechanism design of the notebook computer.

SUMMARY OF THE INVENTION

The present invention provides a portable computer with easy assembly for solving above drawbacks.

According to the claimed invention, a portable computer includes a display module, a hinge module, and a host module. An end of the hinge module is connected to the display module. The host module includes a housing whereon an accommodating space is formed and a battery component installed on the housing for covering the accommodating space so as to cover the hinge module. The other end of the hinge module is fixed inside the accommodating space.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
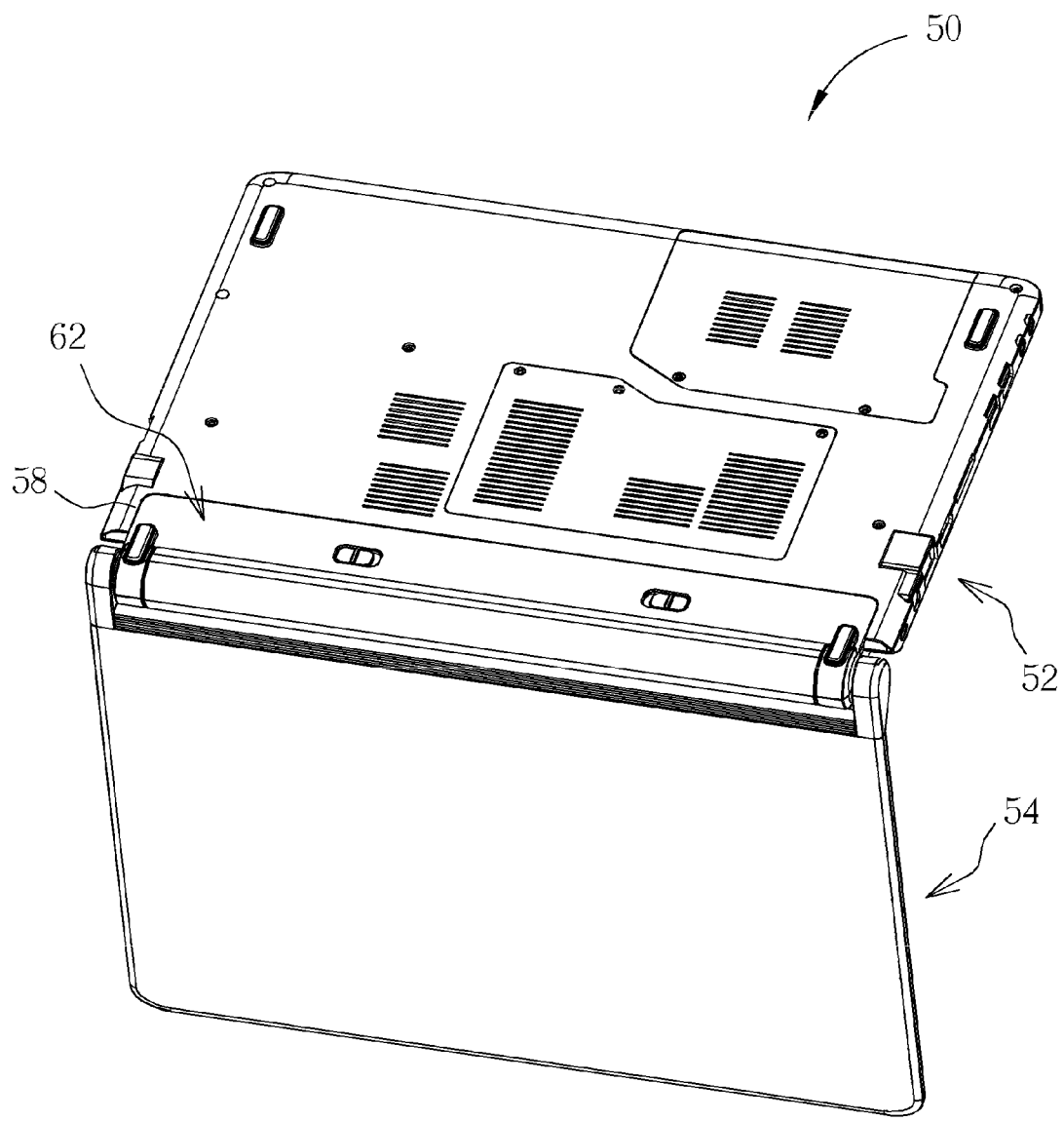
FIG. 1 is a perspective drawing of a portable computer according to a preferred embodiment of the present invention.
Figure 2:
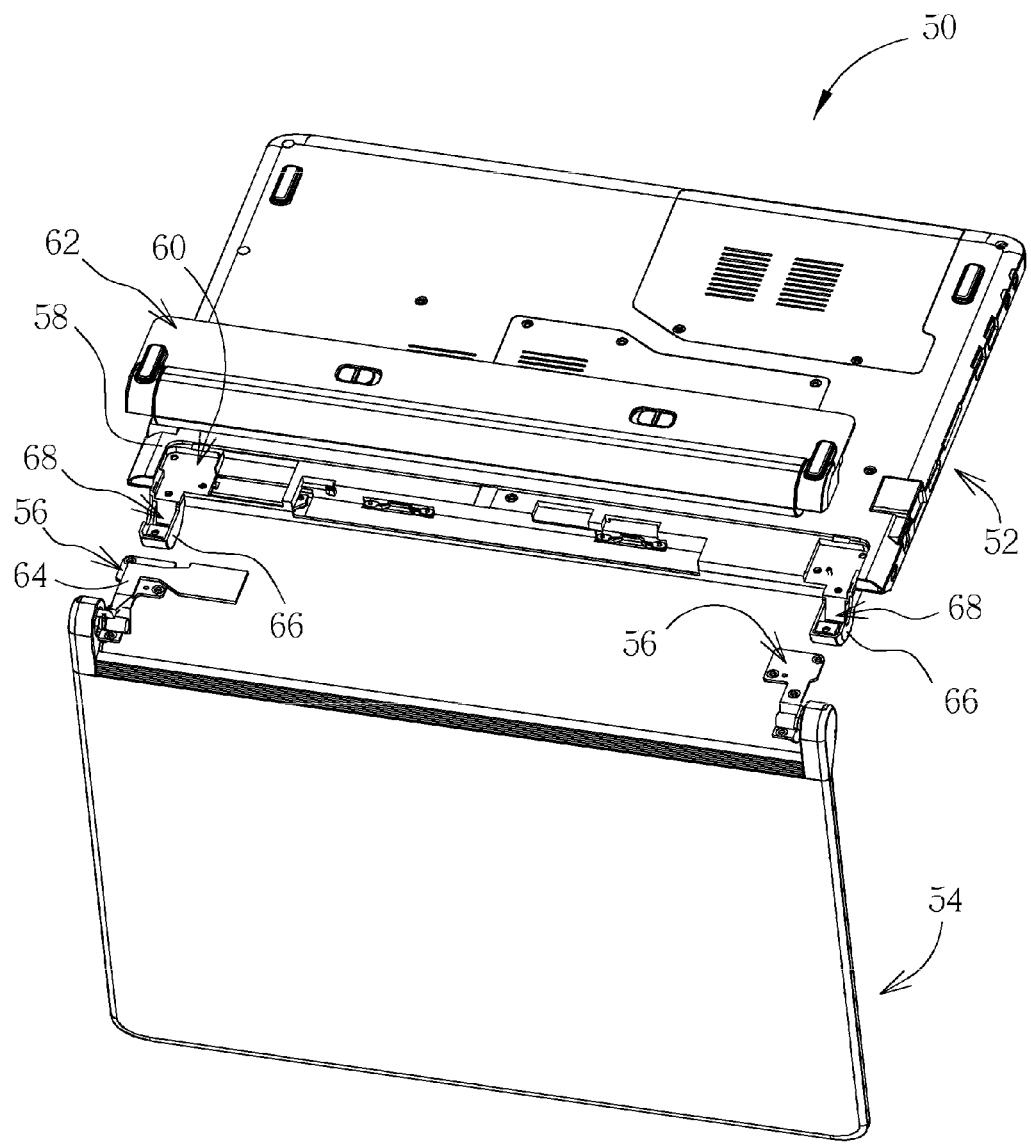
FIG. 2 is an exploded diagram of components of the portable computer according to the preferred embodiment of the present invention.

Please refer to FIG. 1 and FIG. 2. FIG. 1 is a perspective drawing of a portable computer 50 according to a preferred embodiment of the present invention. FIG. 2 is an exploded diagram of components of the portable computer 50 according to the preferred embodiment of the present invention. The portable computer 50 can be a notebook computer. The portable computer 50 includes a host module 52 for controlling operation of the portable computer 50. The portable computer 50 further includes a display module 54 for displaying operating images of the host module 52. The display module 54 can be a liquid crystal display. The portable computer 50 further includes at least one hinge module 56. Two ends of each hinge module 56 are connected to the host module 52 and the display module 54 respectively, so that the display module 54 can be combined with the host module 52 in a rotatable manner. In this embodiment, two hinge modules 56 are disposed on two sides of the portable computer 50 respectively. An amount and positions of the hinge modules 56 are not limited to the above-mentioned embodiment and depend on design demand. The two hinge modules 56 have the same structural design, and following description illustrates one of the hinge modules 56 for simplicity. The host module 52 includes a housing 58 whereon an accommodating space 60 is formed. An end of the hinge module 56 is connected to the display module 54, and the other end of the hinge module 56 is fixed inside the accommodating space 60. The host module 52 further includes a battery component 62 installed on the housing 58 for covering the accommodating space 60 so as to cover the hinge module 56. The battery component 62 can provide electricity to the portable computer 50.

Figure 3:
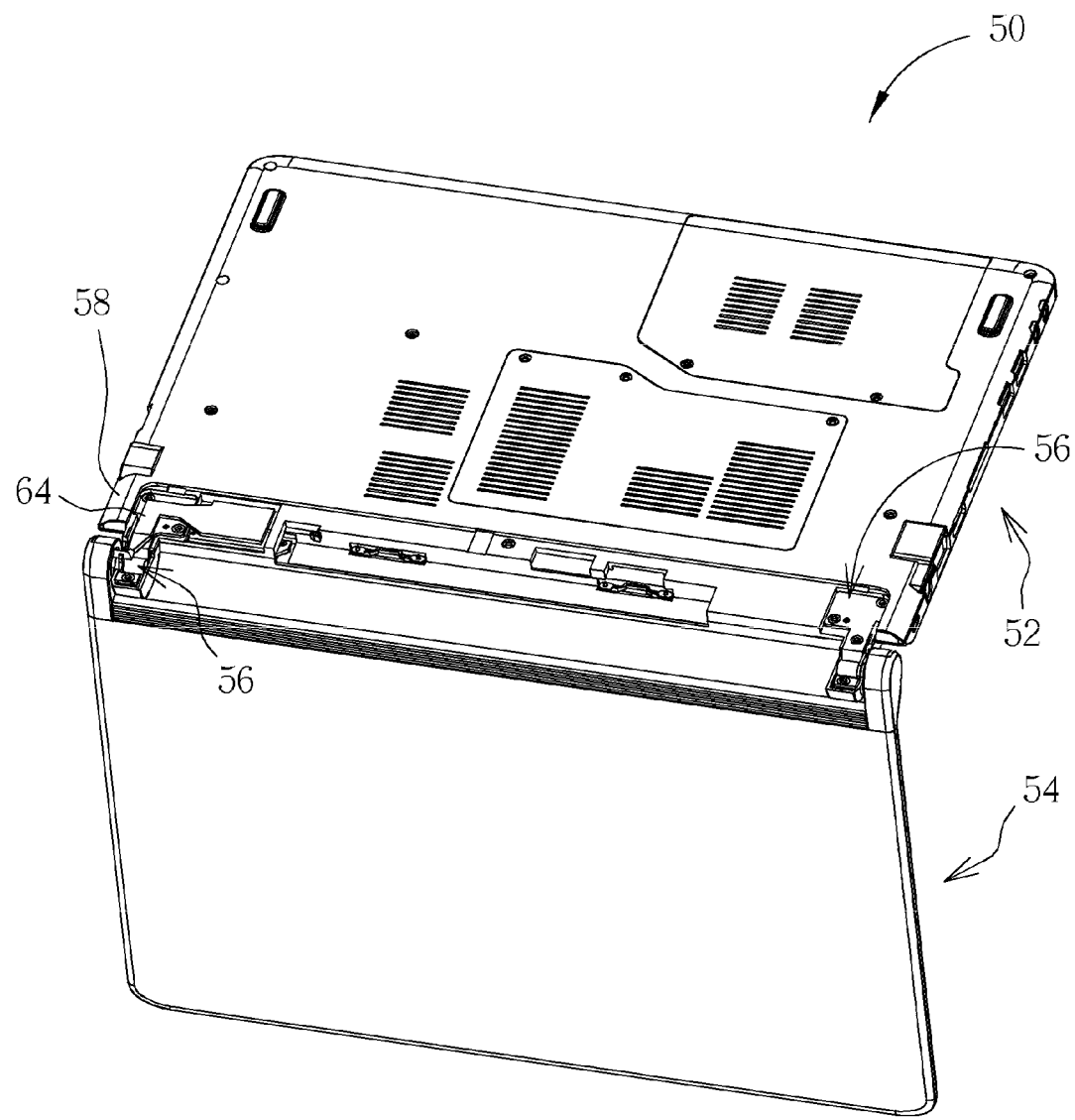
FIG. 3 is a diagram of the portable computer without assembling a battery component according to the preferred embodiment of the present invention.
Figure 4:
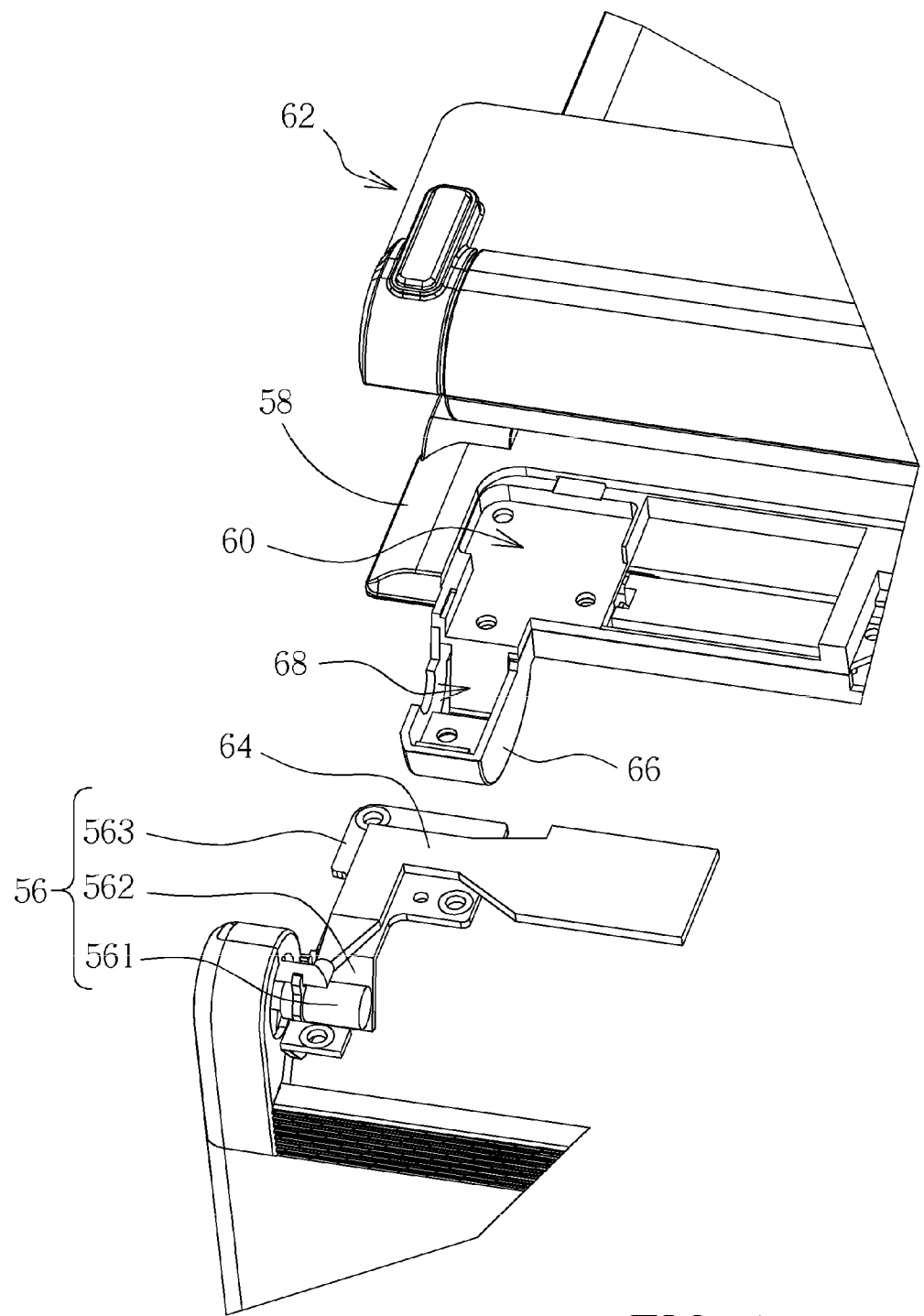
FIG. 4 is an enlarged exploded diagram of parts of the portable computer shown in FIG. 2 according to the preferred embodiment of the present invention.
Figure 5:
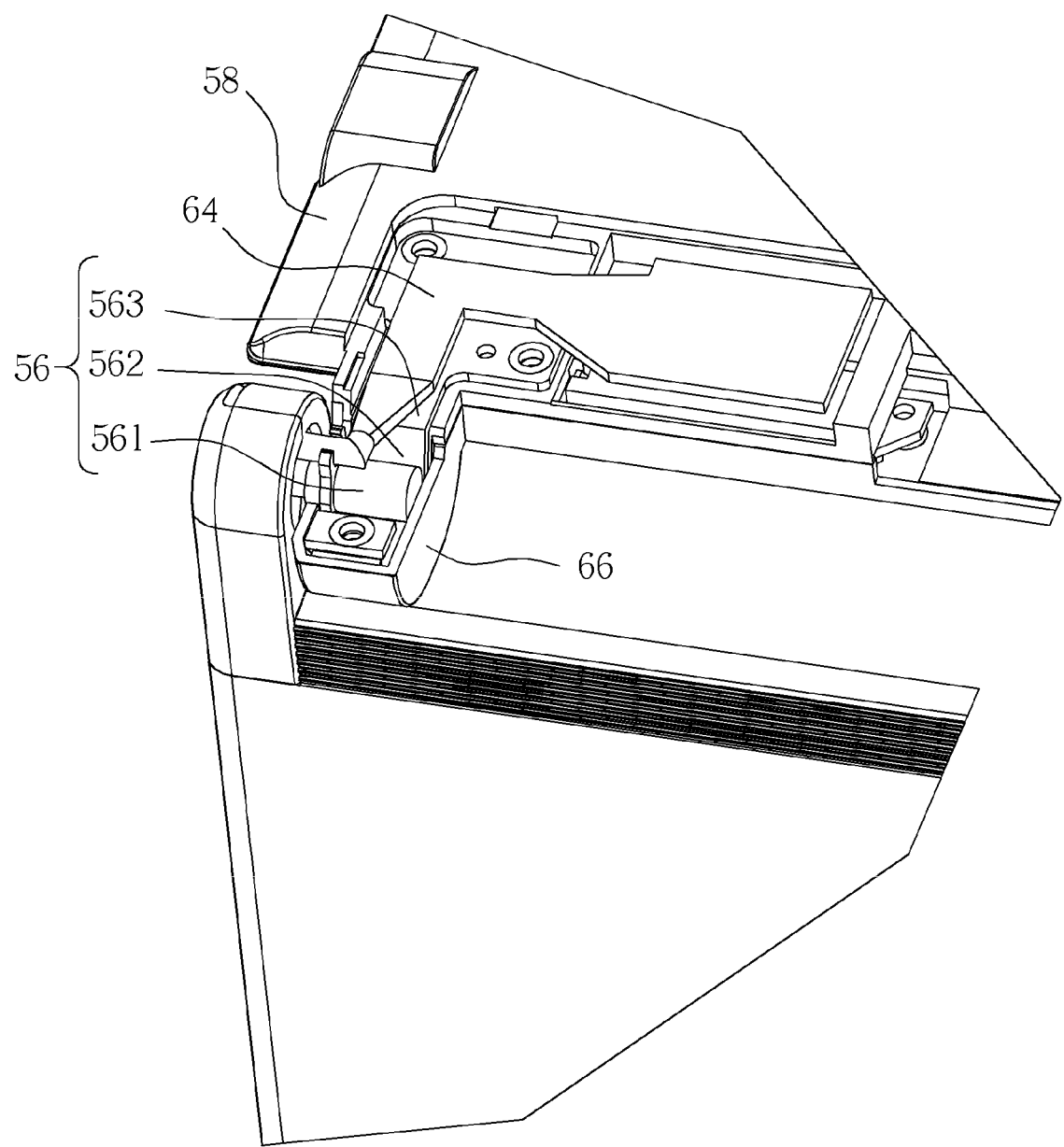
FIG. 5 is an enlarged assembly diagram of the portable computer shown in FIG. 3 according to the preferred embodiment of the present invention.

Please refer to FIG. 3, FIG. 4, and FIG. 5. FIG. 3 is a diagram of the portable computer 50 without assembling the battery component 62 according to the preferred embodiment of the present invention. FIG. 4 is an enlarged exploded diagram of parts of the portable computer 50 shown in FIG. 2 according to the preferred embodiment of the present invention. FIG. 5 is an enlarged assembly diagram of the portable computer 50 shown in FIG. 3 according to the preferred embodiment of the present invention. The battery component 62 is omitted in FIG. 3 for clearly showing connection between the hinge module 56, the host module 52, and the display module 54. The hinge module 56 includes a hinge 561 pivoted to the display module 54. The hinge module 56 further includes a first structural component 562 connected to the hinge 561. The hinge module 56 further includes a second structural component 563 connected to the first structural component 562 and fixed on the housing 58. For example, the second structural component 563 can be screwed on the housing 58. In addition, an angle is formed between the first structural component 562 and the second structural component 563, and the angle can be substantially 90 degrees. That is to say, the first structural component 562 can be perpendicular to the second structural component 563. The first structural component 562 and the second structural component 563 can be made of metal material respectively, and the first structural component 562 can be integrated with the second structural component 563 monolithically. Because the hinge 561 of the hinge module 56 is pivoted to the display module 54 and the second structural component 563 is fixed on the housing 58, an end of the hinge module 56 is connected to the display module 54 in a rotatable manner so that the display module 54 can rotate relative to the host module 52. On the other hand, the hinge 561 can further be pivoted to the host module 52 and the second structural component 563 can be fixed on the display module 54, so that the host module 52 can rotate relative to the display module 54, which operates in similar principle as the one mentioned above and detailed description is omitted herein for simplicity. The portable computer 50 further includes a transmission cable 64 disposed on a side of the hinge module 56. Two ends of the transmission cable 64 are electrically connected to the display module 54 and the host module 52 respectively, so as to transmit signals and the electricity between the display module 54 and the host module 52.

Figure 6:
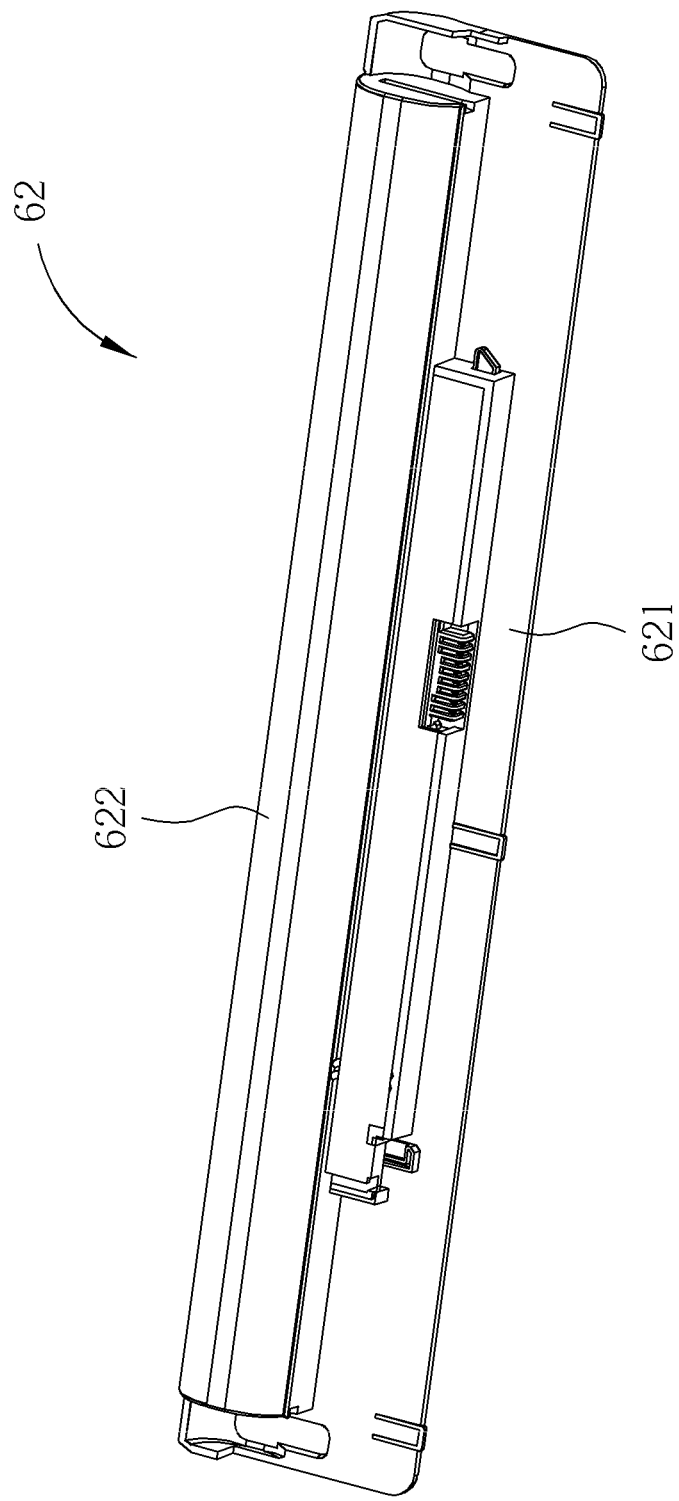
FIG. 6 is a perspective drawing of the battery component according to the preferred embodiment of the present invention.

Besides, the housing 58 of the host module 52 includes at least one protruding portion 66. In this embodiment, two protruding portions 66 are respectively disposed on two sides of the housing 58 of the portable computer 50. An amount and the positions of the protruding portions 66 are not limited to the above-mentioned embodiment and depend on design demand. The two protruding portions 66 have the same structural design, and following description illustrates one of the protruding portions 66 for simplicity. A slot 68 is formed on the protruding portion 66, and the hinge 561 and the first structural component 562 of the hinge module 56 can be disposed inside the slot 68 of the protruding portion 66. Please refer to FIG. 6. FIG. 6 is a perspective drawing of the battery component 62 according to the preferred embodiment of the present invention. The battery component 62 includes a cover 621 for covering the accommodating space 60 of the housing 58 and the slot 68 of the protruding portion 66. The battery component 62 further includes a cell 622 disposed on the cover 621 for providing the electricity to the portable computer 50. As the battery component 62 is installed on the housing 58, the cell 622 is installed between the two protruding portions 64 so that rotation of the display module 54 relative to the host module 52 is not interfered by the cell 622.

As the battery component 62 is installed on the housing 58, the cover 621 can cover the accommodating space 60 of the housing 58 and the slot 68 of the protruding portion 66, that is, the battery component 62 can totally cover the hinge module 56, so that the hinge module 56 is hidden for artistic appearance of the portable computer 50. In addition, because the host module 52 and the display module 54 can be assembled independently, which means the host module 52 and the display module 54 are two separated objects, and the liquid crystal display does not have to be assembled with the host before an upper cover of the host is combined with a lower cover. Therefore, a consumer can selectively purchase the host module 52 and the display module 54, such as the host module 52 and the display module 54 having different colors and shapes, and it drives multi-changes of the portable computer 50 on appearance to meet the trend of product mechanical design. Furthermore, two production lines can be set in a factory. One of the production lines is for fabricating the host module 52, and the other one of the production lines is for fabricating the display module 54, so as to increase production efficiency of the portable computer 50 effectively.

Comparing to the prior art, the portable computer of the present invention utilizes modular assembly to combine the display module with the host module. The present invention not only can assemble the host module and the display module conveniently, but also can provide design flexibility of the portable computer and increase the production efficiency of the portable computer.

Those skilled in the art will readily observe that numerous modifications and alterations of the device and method may be made while retaining the teachings of the invention.

What is claimed is:

1. A portable computer comprising: a display module; a hinge module with a first end and a second end, the first end of the hinge module being connected to the display module in a rotatable manner with the second end; and a host module comprising: a housing comprising an upper cover and a lower cover assembled with the upper cover, the lower cover having an interior surface and an exterior surface opposite to each other, the interior surface of the lower cover facing and being covered by the upper cover, the exterior surface of the lower cover not facing and not being covered by the upper cover, an accommodating space being formed on the exterior surface of the lower cover and not covered by the upper cover, the hinge module being separated from the housing and the second end of the hinge module being detachably assembled inside the accommodating space on assembly of the lower cover and the upper cover after the lower cover has been assembled with the upper cover so that the display module is capable being assembled with the host module after the lower cover has been assembled with the upper cover; and a battery component installed on the housing for covering the accommodating space so as to cover the hinge module.

2. The portable computer of claim 1, wherein the hinge module comprises:
a hinge pivoted to the display module;
a first structural component connected to the hinge; and
a second structural component connected to the first structural component and fixed on the lower cover of the housing, an angle being formed between the first structural component and the second structural component.

3. The portable computer of claim 2, wherein the housing comprises a protruding portion, a slot is formed on the protruding portion, and the hinge and the first structural component are disposed inside the slot of the protruding portion.

4. The portable computer of claim 3, wherein the battery component comprises:
a cover for covering the accommodating space of the housing and the slot of the protruding portion; and
a cell disposed on the cover and installed on a side of the protruding portion for providing electricity to the portable computer.

5. The portable computer of claim 2, wherein the angle between the first structural component and the second structural component is 90 degrees substantially.

6. The portable computer of claim 2, wherein the second structural component is locked on the housing.

7. The portable computer of claim 2, wherein the first structural component is integrated with the second structural component monolithically.

8. The portable computer of claim 1, wherein the battery component comprises:
a cover for covering the accommodating space of the housing; and
a cell disposed on the cover for providing electricity to the portable computer.

9. The portable computer of claim 1 further comprising:
a transmission cable disposed on a side of the hinge module, two ends of the transmission cable being electrically connected to the display module and the host module respectively, so as to transmit signals or electricity between the display module and the host module.

* * * * *

UNITED STATES PATENT AND TRADEMARK OFFICE
CERTIFICATE OF CORRECTION

PATENT NO. : 8,934,230 B2
APPLICATION NO. : 12/826686
DATED : January 13, 2015
INVENTOR(S) : Hsiung et al.

Page 1 of 1

It is certified that error appears in the above-identified patent and that said Letters Patent is hereby corrected as shown below:

On the title page, item(73), delete the residence of the assignee from "Hsinchih, New Taipei (TW)" to --Hsichih, New Taipei (TW)--.

Signed and Sealed this
Twenty-eighth Day of April, 2015

Michelle K. Lee
*Director of the United States Patent and Trademark Office*